US012679220B2

(12) United States Patent
Banno

(10) Patent No.: US 12,679,220 B2
(45) Date of Patent: Jul. 14, 2026

(54) ELECTRIFIED VEHICLE

(71) Applicant: TOYOTA JIDOSHA KABUSHIKI KAISHA, Toyota (JP)

(72) Inventor: Takaomi Banno, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 18/741,779

(22) Filed: Jun. 13, 2024

(65) Prior Publication Data

US 2025/0135911 A1 May 1, 2025

(30) Foreign Application Priority Data

Oct. 26, 2023 (JP) ................................. 2023-183662

(51) Int. Cl.
*B60L 15/20* (2006.01)

(52) U.S. Cl.
CPC ....... *B60L 15/2063* (2013.01); *B60L 2240/12* (2013.01); *B60L 2240/423* (2013.01); *B60L 2240/62* (2013.01); *B60L 2250/26* (2013.01)

(58) Field of Classification Search
CPC ............. B60L 15/2063; B60L 2240/12; B60L 2240/423; B60L 2240/62; B60L 2250/26; B60L 2260/26; Y02T 10/72
See application file for complete search history.

(56) References Cited

U.S. PATENT DOCUMENTS

2013/0090799 A1    4/2013   Nakamura et al.
2017/0174202 A1*   6/2017   Sasaki ................. B60L 15/2009

FOREIGN PATENT DOCUMENTS

JP          2012-016168 A      1/2012

* cited by examiner

*Primary Examiner* — Alan D Hutchinson
(74) *Attorney, Agent, or Firm* — SoraIP, Inc.

(57) ABSTRACT

An electrified vehicle includes a drive device including a driving motor for traveling and a power storage device for exchanging electric power with the motor, a drive device that controls the drive device so as to travel by switching between the manual driving mode and the automated driving mode, and a control device that cuts the creep torque when the creep torque is satisfied when the creep torque is outputted from the motor. In the automatic operation mode, the control device relaxes the creep cut condition as compared with the manual operation mode.

1 Claim, 2 Drawing Sheets

ELECTRIFIED VEHICLE

CROSS-REFERENCE TO RELATED APPLICATION

This application claims priority to Japanese Patent Application No. 2023-183662 filed on Oct. 26, 2023, incorporated herein by reference in its entirety.

BACKGROUND

1. Technical Field

The present disclosure relates to an electrified vehicle.

2. Description of Related Art

Conventionally, there has been proposed an electrified vehicle including a motor for travel and a power storage device that exchanges electric power with the motor, the electrified vehicle being capable of traveling at a low speed using creep torque from the motor and capable of executing creep cut to reduce creep torque of the electric motor while a creep cut condition is met, the creep cut condition being met when the absolute value of the vehicle speed is less than a stop determination vehicle speed and the braking force is equal to or more than a set braking force (see Japanese Unexamined Patent Application Publication No. 2012-016168 (JP 2012-016168 A), for example).

SUMMARY

In such an electrified vehicle, power consumption may not be sufficiently suppressed if a priority is given to the response to an acceleration request from a driver in an autonomous driving mode, by using the same creep cut condition as in a manual driving mode. Thus, electric efficiency may not be sufficiently improved.

A main object of the electrified vehicle according to the present disclosure is to improve electric efficiency in an autonomous driving mode.

In order to achieve the above main object, the electrified vehicle according to the present disclosure adopts the following measures.

An aspect of the present disclosure provides an electrified vehicle including:

a drive device that includes a motor for travel and a power storage device that exchanges electric power with the motor; and a control device that controls the drive device so as to travel by switching between a manual driving mode and an autonomous driving mode, cuts creep torque when a creep cut condition is met when the creep torque is output from the motor, and relaxes the creep cut condition in the autonomous driving mode compared to when in the manual driving mode.

In the electrified vehicle according to the present disclosure, the drive device is controlled so as to travel by switching between the manual driving mode and the autonomous driving mode. Further, creep torque is cut when a creep cut condition is met when the creep torque is output from the motor. In this case, the creep cut condition is relaxed in the autonomous driving mode compared to when in the manual driving mode. This makes it easy to cut the creep torque when in the autonomous driving mode compared to when in the manual driving mode, suppressing power consumption of the vehicle and improving electric efficiency. As a matter of course, a priority can be given to the response to an acceleration request from a driver when in the manual driving mode.

In the electrified vehicle according to the present disclosure, the creep cut condition may be a condition that a vehicle speed is equal to or less than a first vehicle speed and that a brake is on when in the manual driving mode, and a condition that the vehicle speed is equal to or less than a second vehicle speed that is equal to or more than the first vehicle speed when in the autonomous driving mode.

In the electrified vehicle according to the present disclosure, the control device may control the motor such that a vehicle speed reaches a target vehicle speed based on a present location of the vehicle when in the autonomous driving mode; and the creep cut condition may be a condition that the vehicle speed is equal to or less than a first vehicle speed and that a brake is on when in the manual driving mode, and a condition that the target vehicle speed is equal to or less than a second vehicle speed that is equal to or more than the first vehicle speed when in the autonomous driving mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
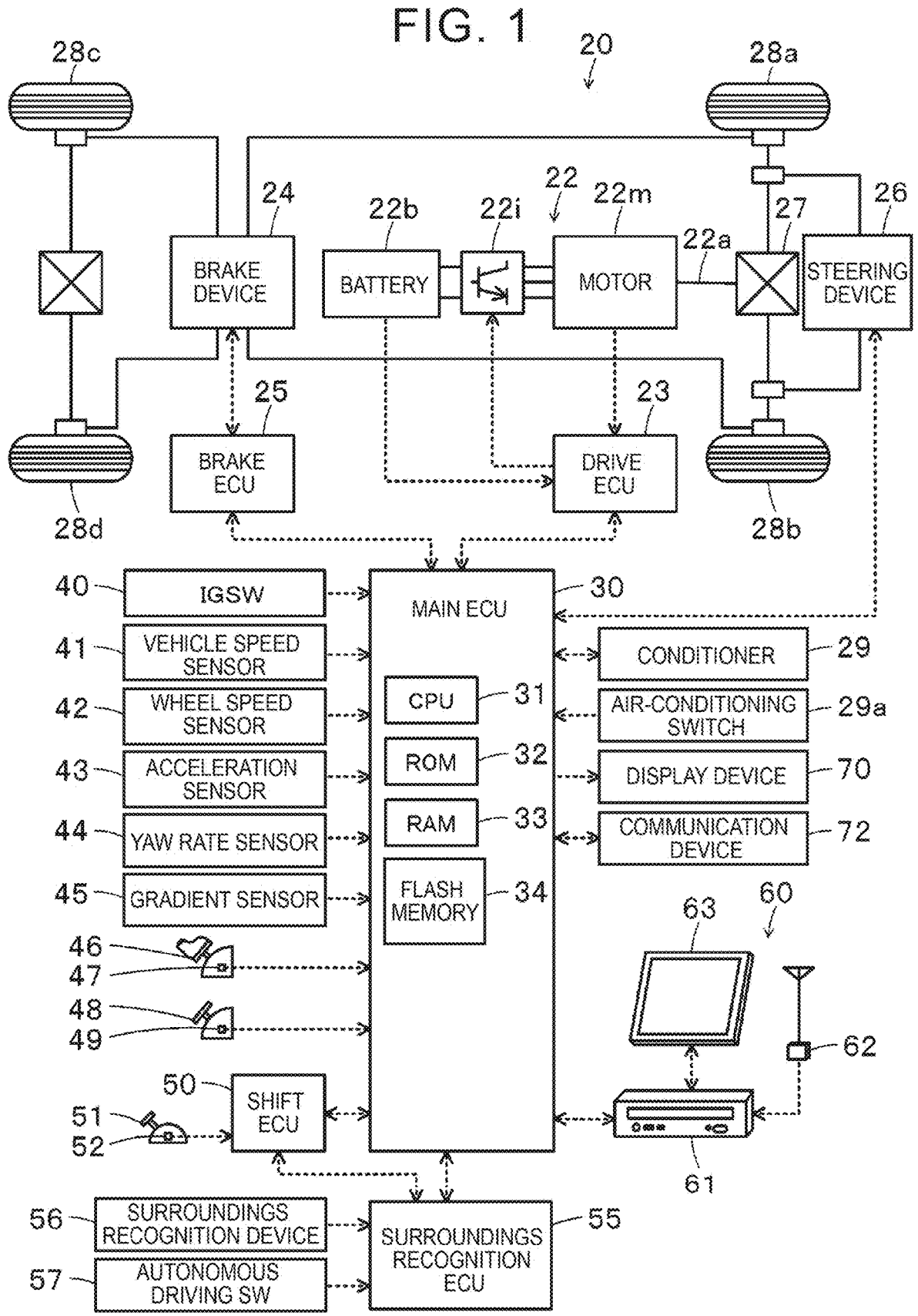
FIG. 1 is a configuration diagram illustrating an outline of a configuration of a battery electric vehicle 20.

Embodiments of the present disclosure will be described with reference to the drawings. FIG. 1 is a configuration diagram schematically illustrating a configuration of a battery electric vehicle 20 according to an embodiment of the present disclosure. As illustrated, battery electric vehicle 20 of the embodiment includes a drive device 22, a brake device 24, a steering device 26, an air conditioner 29, and a main electronic control unit (hereinafter referred to as "main ECU") 30.

The drive device 22 is configured as a device that rotationally drives a drive shaft 22a connected to the drive wheels 28a, 28b via a differential gear 27, and includes a motor 22m, an inverter 22i, and a battery 22b. The motor 22m is configured as, for example, a synchronous generator motor, and the rotor of the motor 22m is connected to the drive shaft 22a. The inverter 22i includes a plurality of switching elements and is connected to the power line together with the battery 22b. The motor 22m is rotationally driven by switching of the plurality of switching elements of the inverter 22i.

The drive device 22 is controlled by a driving electronic control unit (hereinafter referred to as "drive ECU") 23. Although not shown, the drive ECU 23 includes a microcomputer having a CPU, a ROM, a RAM, a flash memory, an input/output port, and a communication port. Signals from various sensors are input to the drive ECU 23 through an input port. For example, the drive ECU 23 receives a rotational position Om from a rotational position sensor that detects the rotational position of the rotor of the motor 22m, a voltage sensor attached to the battery 22b, a voltage Vb from the current sensor, and a current Ib. The drive ECU 23 performs switching control of a plurality of switching elements of the inverter 22i, for example. The drive ECU 23 calculates the rotational speed Nm of the motor 22m (the rotational speed in the drive shaft 22a) based on the rotational position Oa of the rotor of the motor 22m from the rotational position sensor. The drive ECU 23 communicates with the main ECU 30 via a communication port.

The brake device 24 is configured as a known hydraulic drive brake device. The brake device 24 is configured to be able to apply a braking force caused by a braking force caused by depressing the brake pedal 48 and a braking force caused by adjusting the hydraulic pressure to the drive wheels 28a, 28b and the driven wheels 28c, 28d. The brake device 24 is controlled by a brake electronic control unit (hereinafter referred to as a "brake ECU") 25. Although not shown, the braking ECU 25 includes a microcomputer having a CPU, a ROM, a RAM, a flash memory, an input/output port, and a communication port. The brake ECU 25 controls, for example, a braking force caused by a braking force of the brake device 24 and a braking force caused by adjusting the hydraulic pressure. The brake ECU 25 communicates with the main ECU 30 via a communication port.

The steering device 26 is mechanically connected to a steering ring (not shown) and a drive wheels 28a, 28b via a steering shaft, and includes an actuator for steering. The steering device 26 steers the drive wheels 28a, 28b based on the driver's manipulation and drives the actuator based on the steering signal from the main ECU 30 to steer the drive wheels 28a, 28b.

The air conditioner 29 includes a refrigeration cycle and a blower fan, and performs air conditioning in the vehicle cabin.

The main ECU 30 includes a microcomputer having a CPU 31, a ROM 32, a RAM 33, a flash memory 34, an input/output port (not shown), and a communication port. Signals from various sensors are input to the main ECU 30 through an input port. For example, the main ECU 30 receives an air-conditioning instruction signal from an air-conditioning switch 29a that instructs the air conditioner 29 to be turned on and off. The main ECU 30 receives the ignition signal IG from the ignition switch 40, the vehicle speed V from the vehicle speed sensor 41, Vwd from the respective wheel speeds Vwa of the drive wheels 28a, 28b and the driven wheels 28c, 28d from the wheel speed sensor 42, the acceleration a from the acceleration sensor 43, the yaw rate Yr from the yaw rate sensor 44, and the road surface gradient θr from the gradient sensor 45. The main ECU 30 also receives an accelerator position AP from the accelerator pedal position sensor 47 that detects the amount of depression of the accelerator pedal 46 and a brake position BP from the brake pedal position sensor 49 that detects the amount of depression of the brake pedal 48.

The main ECU 30 performs, for example, control of the steering device 26, control of the air conditioner 29, display control of the display device 70, and communication control of the communication device 72. As described above, the main ECU 30 communicates with the drive ECU 23, the brake ECU 25, and the like via a communication port. The main ECU 30 communicates with a shift electronic control unit (hereinafter referred to as "shift ECU") 50, a peripheral recognition electronic control unit (hereinafter referred to as "surroundings recognition ECU") 55, and a navigation device 60 via a communication port.

Although not shown, the shifting ECU 50 includes a microcomputer having a CPU, a ROM, a RAM, a flash memory, an input/output port, and a communication port. A shift position signal from a shift position sensor 52 that detects an operating position of the shift lever 51 is input to the shift ECU 50 via an input port. The shift position includes a parking position (P range), a neutral position (N range), a drive position (D range), a reverse position (R range), and the like. The shift ECU 50 is connected to the main ECU 30 and the surroundings recognition ECU 55 via a communication port. The shift ECU 50 sets the shift 15 position based on the shift position signal from the shift position sensor 52 or the control signal from the surroundings recognition ECU 55, and transmits the set shift position to the main ECU 30.

Although not shown, the surroundings recognition ECU 55 includes a microcomputer having a CPU, a ROM, a RAM, a flash memory, an input/output port, and a communication port. Various types of signals are input to the surroundings recognition ECU 55 through an input port. For example, the surroundings recognition ECU 55 may include a signal from the surroundings recognition device 56 indicating information about the own vehicle or its surroundings (for example, an inter-vehicle distance D1, D2 between the front and rear of the own vehicle or a traveling position of the own vehicle in a lane on a road surface), a mode signal from the autonomous driving switch 57, and the like. Examples of the surroundings recognition device 56 include a camera, a millimeter-wave radar, a quasi-millimeter-wave radar, an infrared laser radar, and a sonar. The autonomous driving switch 57 is a switch for switching between a manual driving mode in which the driver performs a driving operation and an automatic driving mode in which the driver does not perform a driving operation. As described above, the surroundings recognition ECU 55 performs communication with the main ECU 30 and the shift ECU 50 via the communication port.

The navigation device 60 includes a main body 61 having a built-in control unit, a GPS antenna 62 that receives information about the current location of the vehicle, and a display 63. The control unit of the main body 61 includes a storage medium (for example, a hard disk or a SSD), an input/output port, and a communication port in which map information and the like are stored. In the map information, service information (for example, tourist information, a parking lot, and the like), road information in each traveling section (for example, between traffic lights, between intersections, and the like) and the like are stored as a database. The road information includes distance information, width information, lane number information, area information (urban area or suburban area), type information (general road or expressway), gradient information, statutory speed, number of traffic lights, and turning radius of each curve. The display 63 is configured as a touch panel type display capable of displaying various kinds of information such as information on the current location of the own vehicle and a traveling route to a destination, and allowing a user to input various kinds of instructions. When the destination is set by the user operating the display 63, the main body 61 of the navigation device 60 sets the scheduled travel route from the current position of the own vehicle to the destination on the basis of the map information stored in the main body 61, the current position of the own vehicle from GPS antennae 62, and the destination. Then, the main body 61 of the navigation device 60 displays the set travel scheduled route on the display 63, and performs route guidance.

In battery electric vehicle 20 of the embodiment configured as described above, the vehicle travels by switching between the manual driving mode (the autonomous driving switch 57 is turned off) and the automatic driving mode (the autonomous driving switch 57 is turned on). In the manual driving mode, the main ECU 30 sets a required torque Td* for traveling on the basis of the accelerator position AP, the brake position BP, and the vehicle speed V. The main ECU 30 controls the motor 22m (inverter 22i) and the brake device 24 so as to travel at the set required torque Td*. In the embodiment, when the accelerator is off and the vehicle speed V is equal to or less than the threshold Vref0, it is determined that the creep torque condition is satisfied. Then, the creep torque is set to the required torque Td*, and the motor 22m is controlled so that the creep torque is outputted from the motor 22m to the drive shaft 22a. As the threshold Vref0, for example, a degree of 10 km/h from 5 km/h is used.

In the autonomous driving mode, the main ECU 30 sets the target vehicle speed V* based on information from the navigation device 60 (for example, a scheduled traveling route, a current location of the own vehicle, map information, and the like) and information from the surroundings recognition device 56 (for example, information about the own vehicle and its surroundings). The main ECU 30 sets the required torque Td* so that the vehicle speed V becomes the target vehicle speed V*, and controls the motor 22m (inverter 22i), the brake device 24, and the steering device 26 so as to travel at the required torque Td* along the scheduled travel route. In the embodiment, when the vehicle speed V and the target vehicle speed V* are equal to or less than the threshold Vref0, the main ECU 30 determines that the creep torque condition is satisfied. Then, the main ECU 30 sets the creep torque to the required torque Td*, and controls the motor 22m so that the creep torque is outputted from the motor 22m to the drive shaft 22a. The creep torque condition may be a condition in which at least one of the vehicle speed V and the target vehicle speed V* is equal to or less than the threshold Vref0, instead of the condition in which the vehicle speed V and the target vehicle speed V* are equal to or less than the threshold Vref0.

Figure 2:
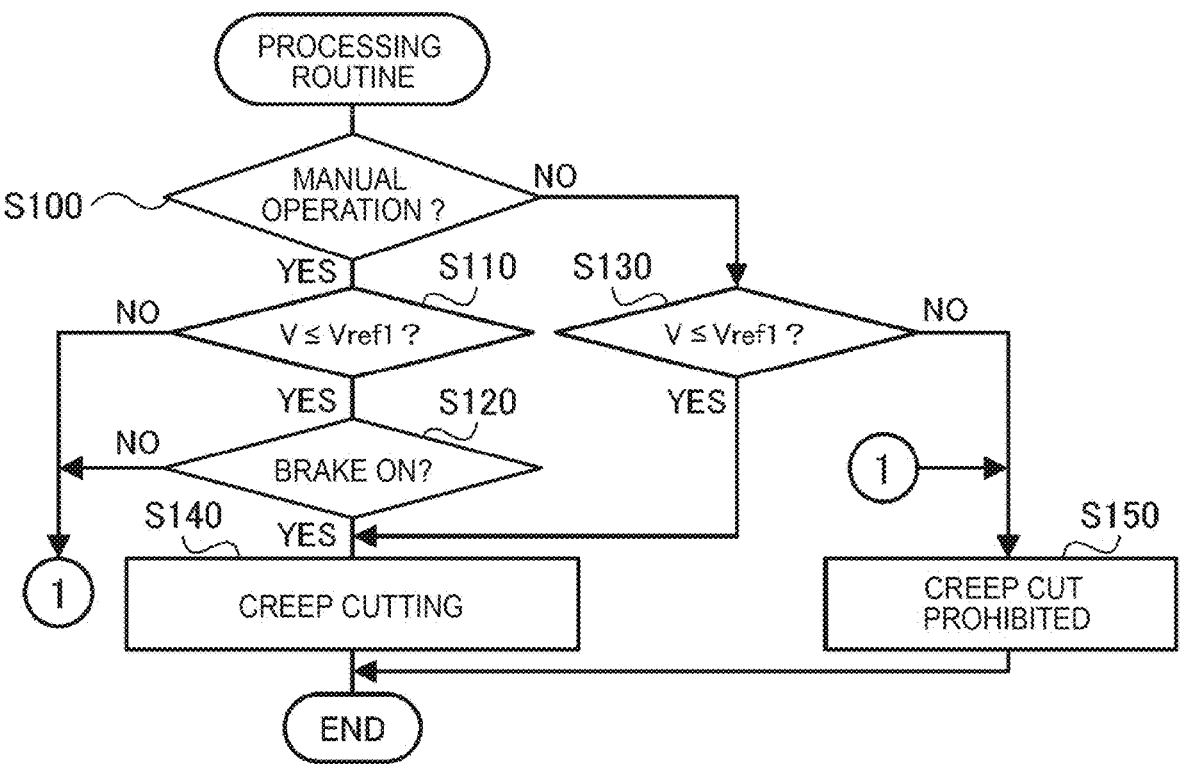
FIG. 2 is a flow chart illustrating an exemplary process routine.

Next, the operation of battery electric vehicle 20 of the embodiment, in particular, the operation when the creep torque is outputted from the motor 22m to the drive shaft 22a will be described. FIG. 2 is a flow chart illustrating a process routine executed by the main ECU 30. This routine is repeatedly executed when the creep torque is outputted from the motor 22m to the drive shaft 22a.

When this routine is executed, the main ECU 30 determines whether it is the manual driving mode or the automated driving mode (S100). Then, when it is determined that the vehicle is in the manual driving mode, it is determined whether or not the vehicle speed V is equal to or less than the threshold Vref1 (S110), and it is determined whether or not the vehicle is in the brake-on state (S120). Here, the threshold value Vref1 is a threshold value used to determine whether or not the vehicle is stopped in the manual driving mode. The threshold Vref1 is determined as a vehicle speed lower than the above-described threshold Vref0, and, for example, about several km/h from 0 km/h is used. The determination process of whether or not the brake is on can be performed by determining at least one of, for example, whether or not the brake pedal 48 is depressed, whether or not braking force is applied from the brake device 24 to the drive wheels 28a, 28b or the driven wheels 28c, 28d, and the like. S110, S120 processes are a process of determining whether or not a creep cut condition for executing a creep torque cut is satisfied in the manual operation mode.

When it is determined in S110 that the vehicle speed V is higher than the threshold Vref1 or when it is determined in S120 that the brake is off, it is determined that the creep cut condition is not satisfied, and the cut of the creep torque is prohibited (S150), and this routine is ended. Then, the creep torque is outputted from the motor 22m to the drive shaft 22a.

When it is determined in S110 that the vehicle speed V is equal to or lower than the threshold Vref1 and S120 that the brake is on, it is determined that the creep cut condition is satisfied, and the creep torque is cut (S140), and the routine is ended. In this case, the creep torque is not outputted from the motor 22m to the drive shaft 22a.

When it is determined in S100 that the vehicle is in the autonomous driving mode, it is determined whether or not the vehicle speed V is equal to or lower than the threshold Vref1 (S130). S130 process is a process of determining whether or not creep-cut conditions are satisfied in the autonomous operation mode.

When it is determined in S130 that the vehicle speed V is higher than the threshold Vref1, it is determined that the creep cut condition is not satisfied, and the cut of the creep torque is prohibited (S150), and this routine is ended. On the other hand, when it is determined in S130 that the vehicle speed V is equal to or lower than the threshold Vref1, it is determined that the creep cut condition is satisfied, and the creep torque is cut (S150), and this routine is ended.

As described above, in the manual driving mode, a condition in which the vehicle speed V is equal to or lower than the threshold Vref1 and the brake is turned on is used as the creep-cut condition. On the other hand, in the autonomous driving mode, a condition in which the vehicle speed V is equal to or lower than the threshold Vref1 is used as the creep-cut condition. That is, in the automatic operation mode, the creep cut condition is relaxed (easily satisfied) as compared with in the manual operation mode. Thus, in the automatic driving mode, the creep torque can be cut more easily than in the manual driving mode, so that the power consumption of the vehicle can be suppressed and the power cost can be improved. In addition, in the manual driving mode, the response to the acceleration request of the driver can be prioritized.

In battery electric vehicle 20 of the present embodiment described above, the creep torque is cut when the creep torque is outputted from the motor 22m to the drive shaft 22a. In this case, in the automatic operation mode, the creep cut condition is relaxed (easier to be established) than in the manual operation mode. Thus, in the automatic driving mode, the creep torque can be cut more easily than in the manual driving mode, so that the power consumption of the vehicle can be suppressed and the power cost can be improved. In addition, in the manual driving mode, the response to the acceleration request of the driver can be prioritized.

Figure 3:
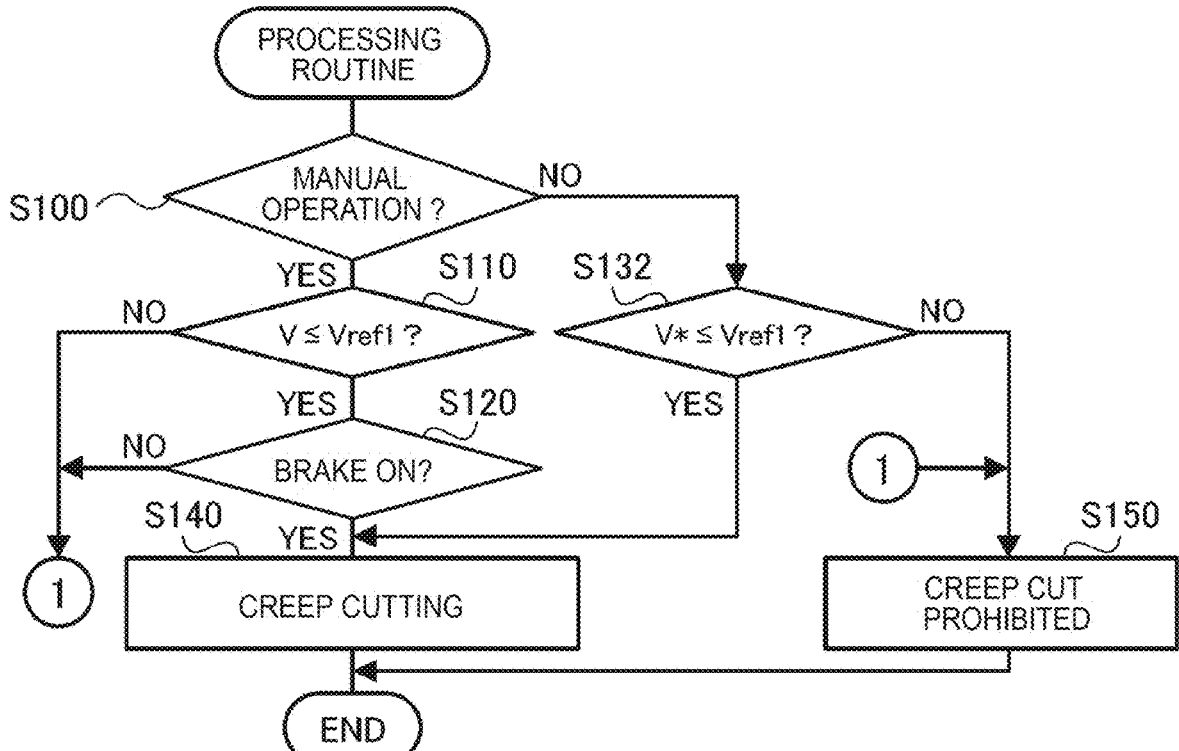
FIG. 3 is a flowchart illustrating an example of a processing routine.

In the above-described embodiment, the main ECU 30 executes the processing routine of FIG. 2, but instead of this, the processing routine of FIG. 3 may be executed. The processing routine of FIG. 3 differs from the processing routine of FIG. 2 in that the processing of S130 is replaced with the processing of S132.

In the process of FIG. 3, when S100 determines that the vehicle is in the autonomous driving mode, it is determined whether or not the target vehicle speed V* is equal to or less than the threshold Vref1 (S132). When it is determined that the target vehicle speed V* is higher than the threshold Vref1, it is determined that the creep cut condition is not satisfied, and the cut of the creep torque is prohibited (S150), and this routine is ended. On the other hand, when it is determined that the target vehicle speed V* is equal to or less than the threshold Vref1, it is determined that the creep cut condition is satisfied, and the creep torque is cut (S150), and this routine is ended.

Considering a case where the vehicle is decelerated and stopped, the target vehicle speed V* decreases, and then the vehicle speed V decreases. Therefore, after the target vehicle speed V* reaches the threshold Vref1 or lower, the vehicle speed V reaches the threshold Vref1. Therefore, instead of using a condition in which the vehicle speed V is equal to or lower than the threshold Vref1 as in S130 of the process of FIG. 2, a condition in which the target vehicle speed V* is equal to or lower than the threshold Vref1 is used. Thus, when the vehicle speed decelerates and stops, the creep torque can be cut at an earlier timing. Thus, the power consumption of the vehicle can be further suppressed.

In the above-described embodiment, in the process routine of FIG. 2, the determination as to whether or not the vehicle in the manual driving mode is stopped and the determination as to whether or not the vehicle in the automated driving mode is stopped are performed using the same threshold Vref1. However, the determination of whether or not the vehicle is stopped in the manual driving mode may be performed using the threshold Vref1, and the determination of whether or not the vehicle is stopped in the automated driving mode may be performed using a threshold Vref2 that is higher than the threshold Vref1 and lower than the threshold Vref0. This makes it easier to cut the creep torque in the automatic driving mode, and thus it is possible to suppress the power consumption of the vehicle. The processing routine of FIG. 3 may be changed in the same manner.

In the above-described embodiment, the drive device 22 is in the form of a battery electric vehicle 20 including a motor 22m, an inverter 22i, and a battery 22b. However, the drive device may be a hybrid electric vehicle including a motor, an inverter, and a battery. The drive device may be a fuel cell electric vehicle including a motor, an inverter, a battery, and a fuel-cell.

The correspondence between the main elements of the embodiments and the main elements of the disclosure described in the column of the means for solving the problem will be described. In the embodiment, the drive device 22 having the motor 22m and the battery 22b corresponds to a "drive device", and the main ECU 30, the drive ECU 23, and the like correspond to a "control device".

The correspondence between the main elements of the embodiment and the main elements of the disclosure described in the section of the means for solving the problem is an example for specifically explaining the embodiment of the disclosure described in the section of the means for solving the problem. Therefore, the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of an electrified vehicle and the like.

What is claimed is:

1. An electrified vehicle comprising:

a drive device that includes a motor for travel and a power storage device that exchanges electric power with the motor; and a control device that controls the drive device so as to travel by switching between a manual driving mode and an autonomous driving mode, cuts creep torque when a creep cut condition is met when the creep torque is output from the motor, and relaxes the creep cut condition in the autonomous driving mode compared to when in the manual driving mode, wherein the control device controls the motor such that a vehicle speed reaches a target vehicle speed based on a present location of the vehicle when in the autonomous driving mode; and wherein the creep cut condition is a condition that the vehicle speed is equal to or less than a first vehicle speed and that a brake is on when in the manual driving mode, and a condition that the target vehicle speed is equal to or less than a second vehicle speed that is equal to or more than the first vehicle speed when in the autonomous driving mode.

* * * * *